United States Patent
Eskelinen et al.

(10) Patent No.: US 9,973,941 B2
(45) Date of Patent: May 15, 2018

(54) METHODS AND APPARATUS FOR ANTENNA TILT OPTIMIZATION

(71) Applicant: NOKIA SOLUTIONS AND NETWORKS OY, Espoo (FI)

(72) Inventors: Petri Eskelinen, Jyvaskyla (FI); Kari Aho, Jyvaskyla (FI); Henrik Martikainen, Jyvaskyla (FI); Seppo Olavi Hamalainen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days. days.

(21) Appl. No.: 14/778,360

(22) PCT Filed: Mar. 19, 2013

(86) PCT No.: PCT/EP2013/055735
§ 371 (c)(1),
(2) Date: Sep. 18, 2015

(87) PCT Pub. No.: WO2014/146700
PCT Pub. Date: Sep. 25, 2014

(65) Prior Publication Data
US 2016/0057633 A1    Feb. 25, 2016

(51) Int. Cl.
*H04W 16/28* (2009.01)
*H04W 24/02* (2009.01)
*H04W 28/08* (2009.01)
*H04W 16/30* (2009.01)

(52) U.S. Cl.
CPC .......... *H04W 16/28* (2013.01); *H04W 24/02* (2013.01); *H04W 28/085* (2013.01); *H04W 16/30* (2013.01)

(58) Field of Classification Search
CPC .... H04W 16/28; H04W 24/02; H04W 28/085
USPC .......................................................... 370/252
See application file for complete search history.

(56) References Cited

U.S. PATENT DOCUMENTS

| | | | |
|---|---|---|---|
| 7,831,280 B2 | 11/2010 | Goldberg | 455/562.1 |
| 2002/0146983 A1* | 10/2002 | Scherzer | H04W 16/28 455/67.11 |
| 2005/0272472 A1 | 12/2005 | Goldberg et al. | 455/562.1 |
| 2006/0193295 A1* | 8/2006 | White | H04L 12/5692 370/336 |
| 2012/0213057 A1* | 8/2012 | Zhang | H04W 24/02 370/216 |
| 2013/0023217 A1* | 1/2013 | Zhuang | H04W 24/02 455/63.1 |

(Continued)

FOREIGN PATENT DOCUMENTS

WO    WO 02/063796 A1    8/2002

OTHER PUBLICATIONS

Saur, Stephan, et al., "Exploring the Vertical Dimension of Dynamic Beam Steering", Multi-Carrier Systems & Solutions (MC-SS), 2011 8th International Workshop on, IEEE, May 3, 2011, 5 pgs.

*Primary Examiner* — Sai Ming Chan
(74) *Attorney, Agent, or Firm* — Harrington & Smith (57) ABSTRACT

Systems and techniques for antenna optimization are described. Information such as statistics relating to conditions are collected, and evaluated against specified criteria in an iterative process. An antenna tilt decision is made based on the evaluation and validated to determine if it should be retained or repeated, or if the tilt should be returned to a previous state.

26 Claims, 8 Drawing Sheets

(56) References Cited

U.S. PATENT DOCUMENTS

| | | | | |
|---|---|---|---|---|
| 2013/0235807 A1* | 9/2013 | Lee | ............... | H04W 16/28 370/329 |
| 2013/0337800 A1* | 12/2013 | Gormley | ............... | H04W 24/08 455/423 |
| 2014/0187235 A1* | 7/2014 | Cai | ............... | H04W 24/10 455/422.1 |
| 2015/0094076 A1* | 4/2015 | Inoue | ............... | H04W 16/28 455/452.1 |

* cited by examiner

METHODS AND APPARATUS FOR ANTENNA TILT OPTIMIZATION

TECHNICAL FIELD

The present invention relates generally to wireless communication. More particularly, the invention relates to improved systems and techniques for optimizing wireless base station antenna direction for vertical sectorization.

BACKGROUND

As the number of wireless cellular data communication devices continues to increase and as their data capabilities continue to be more and more heavily used, the demands on available infrastructure and frequencies continue to increase. The addition of infrastructure to meet demand is costly, and is becoming more and more difficult as unoccupied space suitable for placement of base stations diminishes. In addition, as saturation of available wireless communication frequencies approaches, addition of infrastructure approaches a point of ineffectiveness.

In order to support the growing demand for data communication services, therefore, network operators are turning more and more toward increasing the efficiency of their operations. One mechanism that has shown promise is the use of active antenna systems (AAS) and, in particular, vertical sectorization (VS). Active antenna systems are radio embedded base station antennas that integrate conventional base station radiofrequency (RF) components with the antenna elements. Such an approach has the direct effect of eliminating RF power losses in RF feeder cables and minimizing the number of hardware items to be implemented. One additional significant benefit of AAS is the ability to control antenna parameters electronically, such as by changing azimuth and elevation patterns and steering radiated beams vertically and horizontally by remote electrical tilt (RET). Tilt control provided by AAS may be accomplished on a carrier, frequency, or service basis allowing flexibility for advanced network planning features such as vertical sectorization.

Vertical sectorization increases the number of cells beyond the number provided by conventional mechanisms, generally enabling two cells in the vertical plane per conventional cell sector. In general, the outer sector is optimized for cell coverage and inner sector is adjusted to maximize cell capacity, creating two dedicated cells effectively doubles available resources over the area as a whole, significantly improving performance. Vertical sectorization also allows the direction of dedicated resources to sector edges, thus improving outer sector coverage. In addition, vertical sectorization can lower deployment and operational costs to operators by reducing the number of base station sites required.

SUMMARY

In one embodiment of the invention, an apparatus comprises at least one processor and memory storing computer program code. The memory storing the computer program code is configured to, with the at least one processor, cause the apparatus to at least direct collection of information relating to conditions prevailing in an inner and outer sector of a wireless communication cell and determine adjustment of antenna tilt based on analysis of the conditions, wherein analysis of the conditions is performed with respect to at least one criterion associated with characteristics of the inner sector of the wireless communication cell.

In another embodiment of the invention, a method comprises directing collection of information relating to conditions prevailing in an inner and outer sector of a wireless communication cell and determining adjustment of antenna tilt based on analysis of the conditions, wherein analysis of the conditions is performed with respect to at least one criterion associated with characteristics of the inner sector of the wireless communication cell.

In another embodiment of the invention, a computer-readable medium stores a program of instructions. Execution of the program of instructions by a processor configures an apparatus to at least direct collection of information relating to conditions prevailing in an inner and outer sector of a wireless communication cell and determine adjustment of antenna tilt based on analysis of the conditions, wherein analysis of the conditions is performed with respect to at least one criterion associated with characteristics of the inner sector of the wireless communication cell.

DETAILED DESCRIPTION

Embodiments of the present invention recognize that in a vertical sectorization system, antenna tilt for the inner sector should be selected and optimized so that an inner sector will be able to provide a capacity increase for the system. The outer sectors tilt value depends primarily on propagation, but the ideal tilt value for the inner sector depends on the ever changing location of users in the cell, as well as traffic demand (downlink) and offer (uplink). Such changing conditions pose special challenges to accurate planning of the inner sector antenna tilt, particularly if tilt values need to be changed manually. In addition, if the inner and outer sector operate on the same frequency, an excessively small difference in antenna tilts between the inner and outer sectors can cause significant overlap and interference, decreasing capacity and degrading performance. For example, embodiments of the invention recognize that if a traffic hotspot—that is, an area in which traffic demands of user devices are particularly great—is present in a cell location, tilt values for the inner sector may be optimized so that the area where the traffic hotspot resides would be effectively covered without compromising performance for other user devices.

Embodiments of the invention therefore provide mechanisms for automatic tilt optimization for active antenna/vertical sectorization systems. Embodiments of the invention provide mechanisms for changing the tilt of the inner sector electronically. Such an approach improves service to the non-uniform resource demand that may be presented by users across the sector area and to adapt to constantly changing conditions, seeking the tilt that best provides for an improved capacity.

Figure 1:
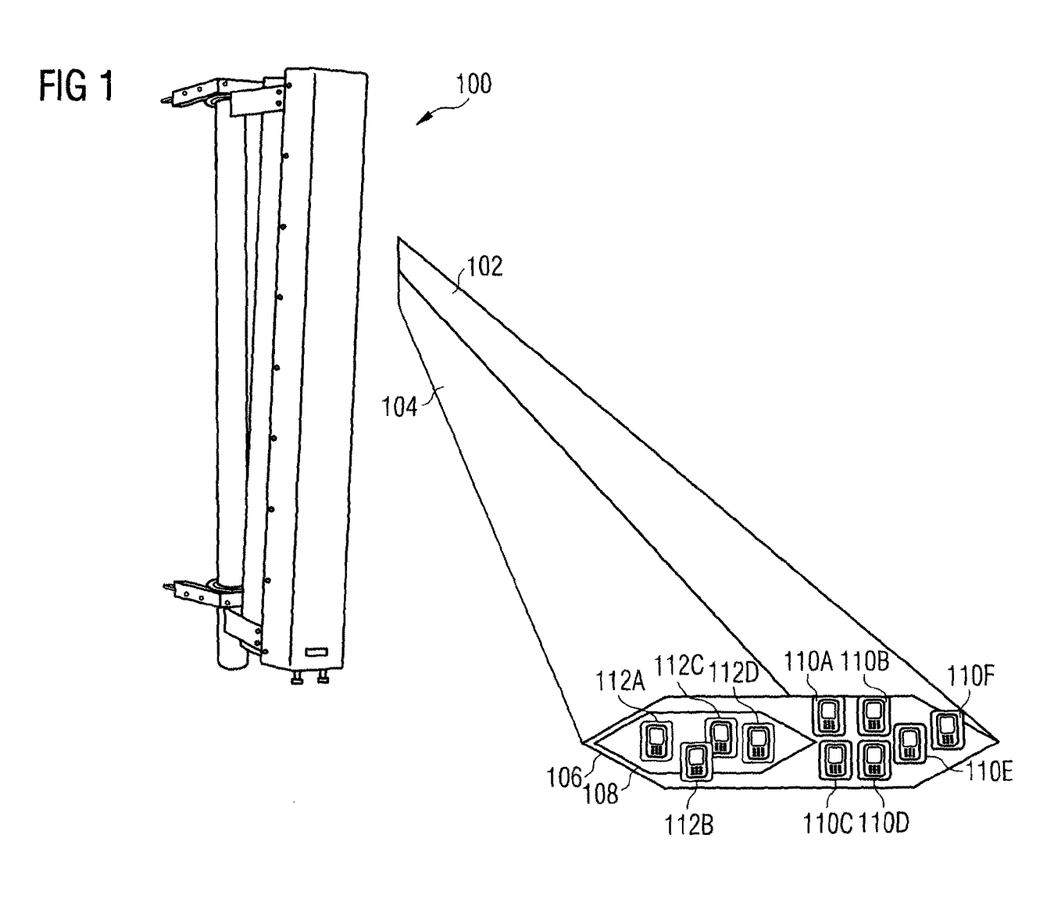
FIG. 1 illustrates a base station defining inner and outer sectors according to an embodiment of the present invention.

FIG. 1 comprises an antenna array 100, emitting vertically controllable beams 102 and 104 that define a cell comprising an outer sector 106 and an inner sector 108. The outer sector 106 serves UEs 110A-110F and the inner sector 108 serves UEs 112A-112D. The antenna array 100 may comprise a plurality of antennas, at least one of whose tilt may be changed electronically, with tilt determination and implementation being accomplished according to one or more embodiments of the present invention.

Figure 2:
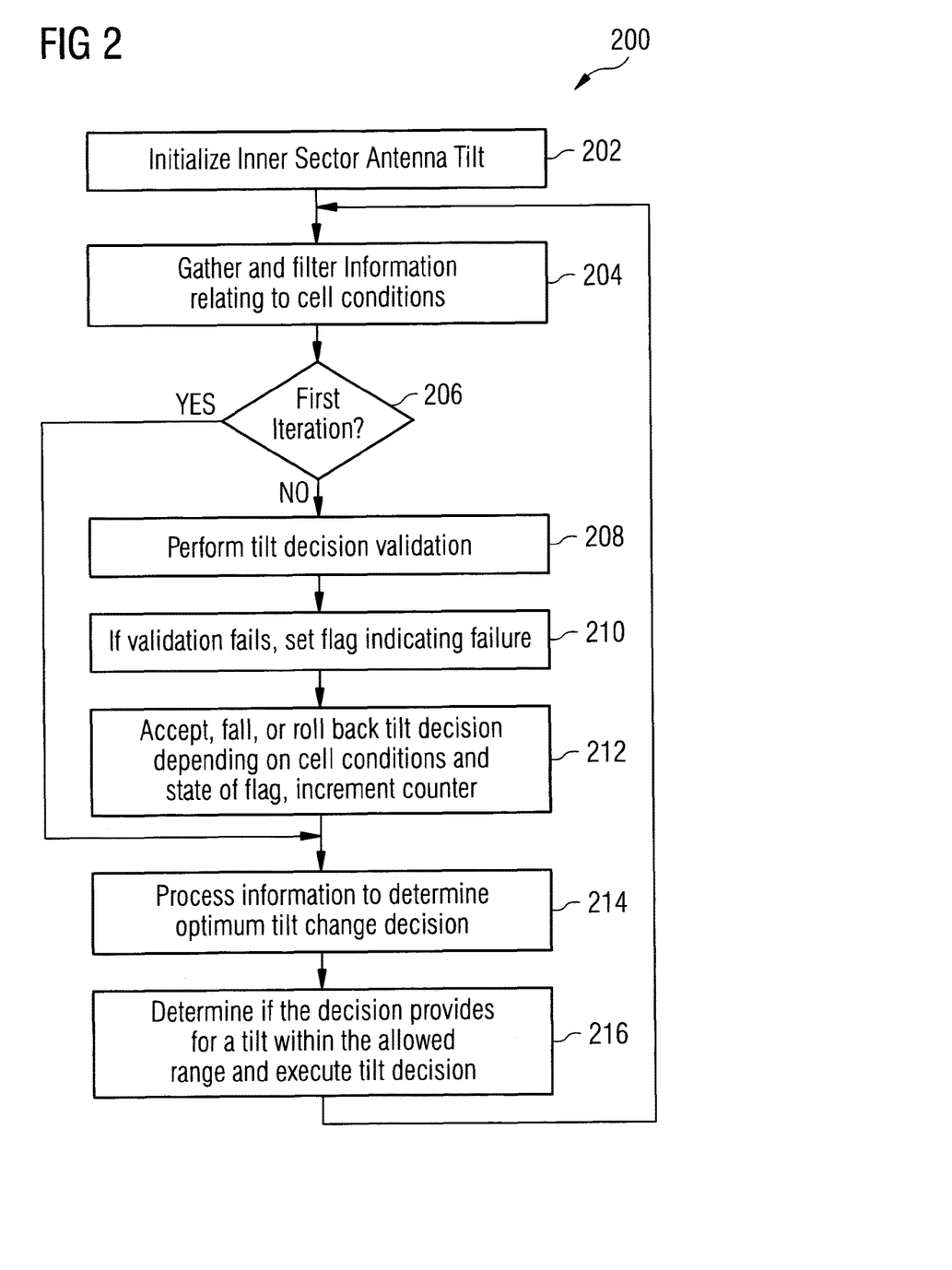
FIGS. 2-7 illustrate processes according to an embodiment of the present invention.

FIG. 2 illustrates a process 200 of automatic antenna tilt optimization according to an embodiment of the present invention. At block 202, inner sector antenna tilt is initialized. Any number of criteria can be made for setting the initial tilt, such as max down, max up, mean between max down or max up, or any number of other selection criteria, such as derivation from a variety of different antenna properties such as mechanical tilt, vertical side lobes, vertical half power beam width (HPBW), base station transmit power distribution, inter-site distance (ISD), antenna height, landscape and propagation environment, and any number of other criteria.

At block 204, gathering and filtering of information relating to cell conditions is performed. Counters and measurements may be collected from available base stations configured to use AAS. Such counters and measurements may comprise, for example, transmit time interval (TTI) and physical resource block (PRB) usage statistics, signal level statistics, such as reference signal received power/reference signal received quality (RSRP/RSCP), RSRQ/EcNo, where EcNo is received energy per chip, power level, and other relevant measurements and information. Measurements may be used locally in a base station by which they are collected, for optimization with respect to the base station, or may be sent to a network management system, such as an operating subsystem (OSS). OSS measurements may include further processes such as aggregation and filtering, to create relevant key performance indicators (KPIs).

At step 206, a determination is made as to whether the iteration is the first iteration. On the first iteration, no previously gathered information relating to cell conditions is available, so that decision validation is irrelevant. Therefore, if the iteration is the first iteration, the process skips to step 214. If the iteration is not the first iteration, the process proceeds to block 208.

At step 208, tilt validation is performed based on a comparison between current conditions and the conditions before the tilt decision performed at step 214. If validation fails, the process proceeds to block 212 and a fail or rollback flag is set. The comparison may be performed against validation criteria such as, for example, key performance indicators (KPIs) and counters. If the failure to achieve the desired result is likely caused by an insufficient change, a fail flag may be set, and if the resulting conditions are worse than the previous conditions in a way indicating that the previous position is better than the changed position, a rollback flag may be set. In one or more embodiments of the invention, the setting of the flags does not cause an immediate change; instead, the flag condition is maintained through a further iteration of a tilt decision, so that a second consecutive tilt decision failure causes a rollback. Thus, the process proceeds to step 214 and the tilt decision is accepted, marked as a failure, and rolled back, depending a combination of the result of comparison of conditions and an examination of the state of the flag.

At block 214, cell condition information such as received measurement information, counters, and KPIs may be processed to determine an optimum antenna tilt change decision. Criteria may include, for example, load balancing based on the number of users per sector. The inner sector tilt may be optimized according to defined target for load balancing in terms of UEs. Example targets can be that ⅓ of the UEs will be in the inner sector and ⅔ of UEs will be in the outer sector. If the inner sector includes more than the target proportion of UEs, a downtilt is indicated, while if the inner sector includes fewer than the target number, an uptilt is indicated. In an additional or alternative approach, load balancing criteria may be based on cell throughput balance between the inner and outer sector, with a goal of keeping inner sector throughput above outer sector throughput. If the inner sector's share of the overall cell load needs to be increased, an uptilt is indicated, while if the inner sector is serving too great a proportion of the throughput, a downtilt is indicated. Such an approach is directed to scaling the sector size to the actual traffic without a need to track the number of UEs within the cell area.

In an alternative or additional approach, a capacity optimization criterion may be chosen to optimize the network to adapt on the traffic demand and available resources across the RF resources in terms of scheduled TTIs. A load can be measured based, for example, on TTI or PRB resources allocated to the users in the inner and outer sectors. Interference limit criteria may be set based, for example, on RSCP/RSRP, modulation and coding scheme (MCS) and/or channel quality information (CQI) distributions, reference signal strength indicator (RSSI) distribution, and other relevant information. It will be understood that a distribution of information may comprise a single information item or value, and may be, for example, an average or median of multiple information items. The use of interference limit criteria insures that sectors will not overlap so as to cause excessive interference to each other (or to neighbouring cells). The application of this criterion occurs when an interference limit is exceeded, and may primarily be used for downtilt in the inner sector.

Fail detection criteria may be set to cause a change when too many radio link failures (RLFs) or inter-system handoffs occur. If any fail detection KPI shows too many failures due to antenna tilt, the decision should be reversed.

In one or more embodiments of the invention, appropriate weightings may be applied to the various criteria, with weightings sufficient to give one criterion precedence over another, but insufficient to cause tilt changes in the absence of network problems.

At block 216, a tilt range check is performed. The tilt range check determines if the tilt decision results in a tilt within a valid range, such as within physical limits of the antenna movement or soft limits, such as limits established to prevent excessively severe intereference or back and forth tilting. The tilt is then implemented—either the tilt indicated by the decision, or the maximum allowable tilt given the range constraints, and a counter is incremented. The process then returns to block 204.

The tilt decision process is thus iterative, with conditions being monitored to determine if a change is called for, with continued iterations allowing for determination whether or not the tilt decision has achieved the desired result and whether a change should be abandoned.

FIG. 3-7 illustrate processes according to one or more embodiments of the present invention; various ones of these processes may be employed to implement one or more of blocks 202-216 of the process 200 or blocks of similar processes.

Figure 3:
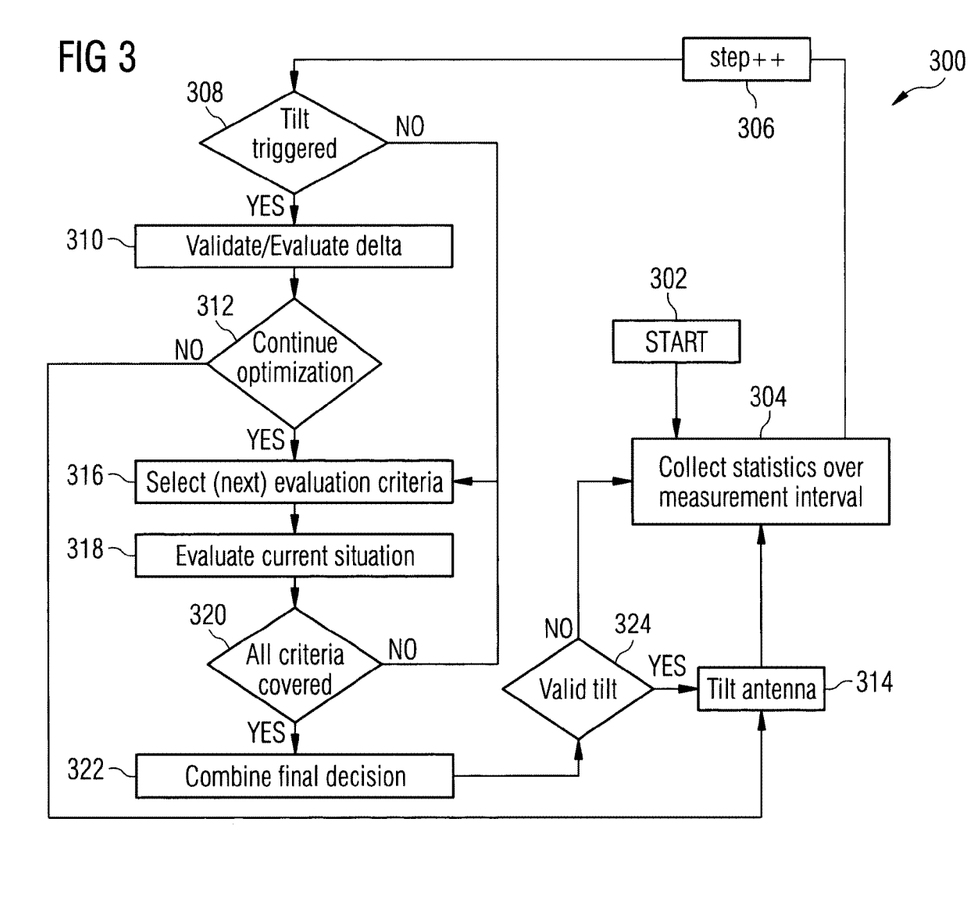

FIG. 3 illustrates a process 300 of initialization of antenna tilt analysis and implementation according to an embodiment of the present invention. The process begins at block 302, and at block 304, statistical data is collected over a specified measurement interval. At block 306, a counter is incremented and at block 308 a determination is made as to whether a tilt was triggered in a previous iteration. If yes, the effect of the previously specified degree of tilt change is evaluated at block 310. At block 312, a determination is made as to whether to continue optimization of the tilt change, or to roll back the tilt change. If rollback is triggered, the previous tilt decision is reversed, the reversal is implemented at block 314 and the process returns to block 304.

Returning now to block 312, if optimization is to be continued, the next evaluation criterion is selected at block 316 and current conditions are evaluated at block 318. At block 320, a determination is made to determine whether all applicable criteria have been addressed. If no, the process returns to block 316.

If all criteria have been addressed, the final tilt decision is processed at block 322 and at block 324 an evaluation is made to determine if the computed tilt is within limits. If yes, the tilt is implemented at block 314, and if no, the process returns to block 304 and statistics collection is performed again.

Returning now to block 308, if no tilt was triggered in the previous iteration, the process proceeds to block 316 and the next evaluation criterion is selected and the process proceeds from there.

The decision generated by each criterion may be downtilt, no change, uptilt, or no decision. Each criterion carries internal rules governing whether to tilt the inner sector and (if the tilt is outside of boundaries specified by the criterion) the tilt direction needed to bring the tilt inside of boundaries. If the tilt is on the target specified by the criterion so that a tilt in either direction could move it beyond the boundaries, the criterion can be said to specify a decision to stay in the current tilt. If tilt change may be needed, but insufficient information has been collected to make the decision, or if the tilt is within boundaries but conditions may be improved by a change in tilt, the criterion calls for no decision—that is, the decision is based on other criteria without a contribution from the criterion in question. The various criteria may be evaluated independently, without a need for analysis of any criterion to be influenced by another, but with analysis of each criterion indicating whether the criterion should contribute to a tilt decision.

Figure 4:
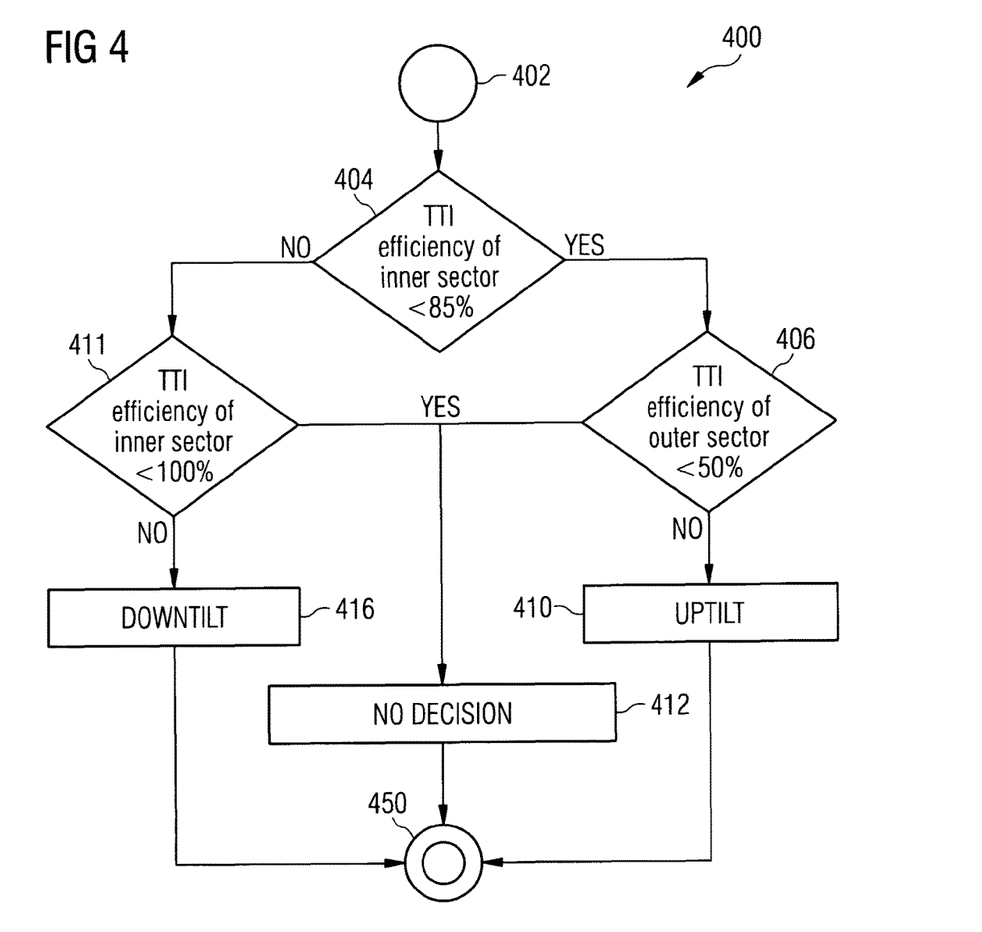

FIG. 4 illustrates a process 400 of tilt decision analysis based on capacity optimization, according to an embodiment of the present invention. At block 402, the process begins and at block 404 the transmission time interval efficiency of the inner sector is examined to determine if it is less than 85%. If yes, the process proceeds to block 406 and a determination is made if the TTI efficiency of the outer sector is less than 50%. If no, the process proceeds to block 410 and an uptilt decision is made; if yes, the process proceeds to block 412 and an indication of no decision is made.

Returning now to block 404, if the TTI efficiency of the inner sector is not less than 85%, the process proceeds to block 414 and a determination is made if the TTI efficiency of the inner sector is less than 100%. If no, a downtilt decision is made at block 416, and if yes, a no decision indication is made at block 412. After block 410, 412, or 416, the process ends at block 450.

Figure 5:
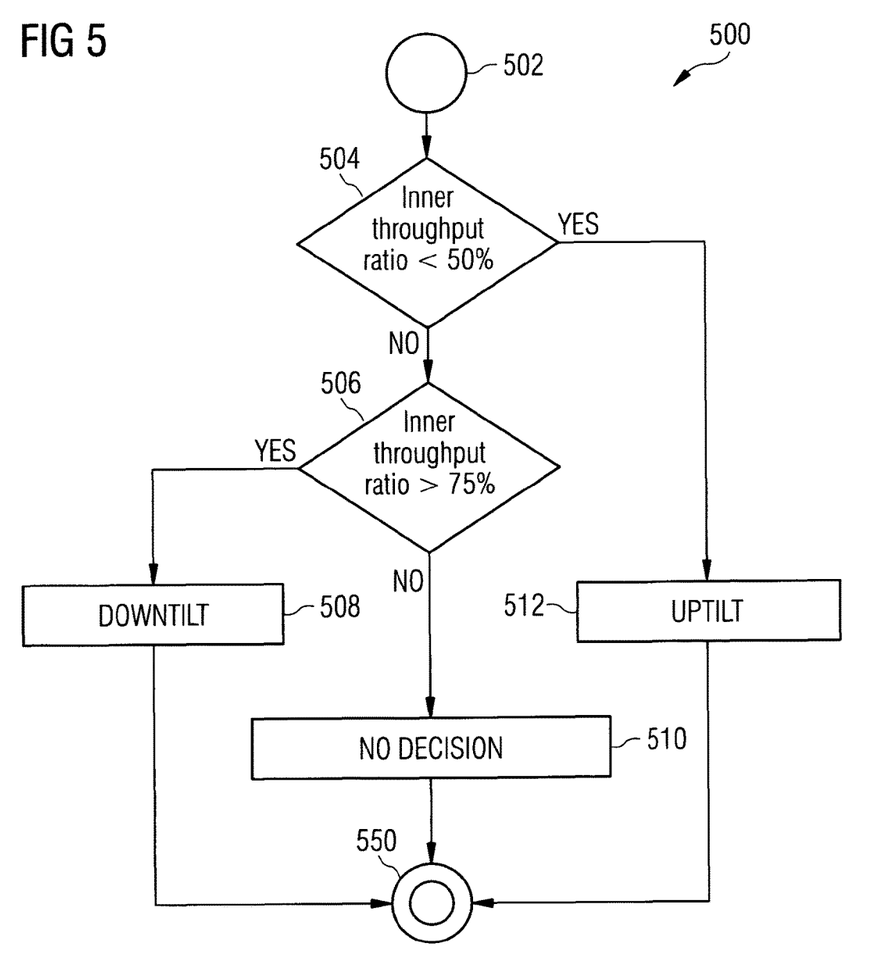

FIG. 5 illustrates a process 500 of tilt decision analysis based on load balancing, according to an embodiment of the present invention. At block 502, a determination is made as to whether the inner throughput ratio is under 50%—if yes, an uptilt decision is made at block 504, and the process then terminates at block 550. If no, a determination is made at block 506 if the inner throughput ratio is over 75%. If yes, a downtilt decision is made at block 508 and the process then terminates at step 550. If no, a no decision indication is made at block 510 and the process then terminates at step 550.

Load balancing criteria, such as is computed using a process such as the process 500, is based on cell throughput balance between the inner and outer sector. The goal may be, for example, to keep inner sector throughput above outer sector throughput. This approach effectively scales the actual traffic without a need to track the number of UEs within cell area. An example target for inner sector cell throughput is between 50-75% of the overall cell load, that is, the throughput on cell dominance area including inner and outer sector. To gain a greater share of the overall cell load, an uptilt decision is made and when the inner sector is serving too great a proportion of the throughput within the cell area a downtilt decision is made.

When optimization is to be performed according to the capacity optimization criteria the target is to adapt to the traffic demand and available resources across the RF resources in terms of scheduled TTIs. The goal is to make sure that most of the inner sector resources are utilized effectively. Using this criterion, prioritization may be performed so that TTI resources of the inner sector are scheduled with (for example) an 85-100% utilization rate, with configurable targets. To accomplish this result, the tilt decision may be "uptilt" if utilization is under the target and "downtilt" if over the target, otherwise the decision would be to "stay" (or "no decision"). The outer sector may have configurable secondary targets for the lower and upper limits of utilized TTI resources, such as 50-95%. The use of such targets exerts control on the tilt decision so as to insure that the outer cell has some share of the load and to prevent it from becoming overloaded. As mentioned, the outer sector targets may be secondary, meaning that if the inner sector is considered to be overloaded (TTI utilization≥100%), it will be downtilted regardless of the outer sector utilization rate, for example using more than 95% of its resources. The upper target of inner sector utilization rate may be set to below 100% because it is impossible to tell if there is congestion with this criterion.

A few examples of other criteria include a minimum number of users in the inner sector, interference limit criteria based on MCS and/or CQI distributions and fail detection criteria acting, for example, when too many Inter-System handovers occur. Such criteria may be assigned weights so as to override other decisions, but to be dormant if there are no problems on the network, i.e., thresholds are not too sensitive to trigger tilt decisions.

Once all the evaluation criteria have been iterated through, the final tilt decision needs to be processed according to weights assigned to different criteria. When multiple criteria are utilized simultaneously the weights of each possible decision (downtilt, stay, uptilt, no decision) are summed together and the tilt decision with the highest weighting value is applied.

Before applying the final tilt decision, faulty tilt decisions may be ruled or filtered out. For example, if a previous tilt decision failed according to evaluation criteria, it is not meaningful to repeat the same tilt decision. In addition, the decision may be validated according to the set of limits used to prevent a tilt command that would effectively cause inner sector antenna tilt out of its physical range (hard limits). Additional "soft limits" may also be set to define a range for practical tilt values—again, to prevent excessively harsh interference or back and forth tilting. Moreover, at this point possible back and forth (Ping-Pong) decisions may also be recorded to suggest better targets or limits for the network operator or automatic target adjustment or validation process.

If the final tilt decision is valid, it will be fed to inner sector components that apply a new downtilt value. After a measurement period analysis validates conditions before tilt those prevailing after the tilt with a separate set of rules that can be easily defined. The validation may be either common or separate for all the optimization criteria. The common validation may be based, for example, on aggregated cell throughput that is expected to increase with a good decision. However, separate validation criteria may be used for optimization criteria serving different objectives. For example, if a criterion is directed toward detecting excessive interference, what is relevant to the criterion is the lowering of the interference, validation may be performed with respect to KPIs that describe the interference conditions rather than the cell throughput.

Figure 6:
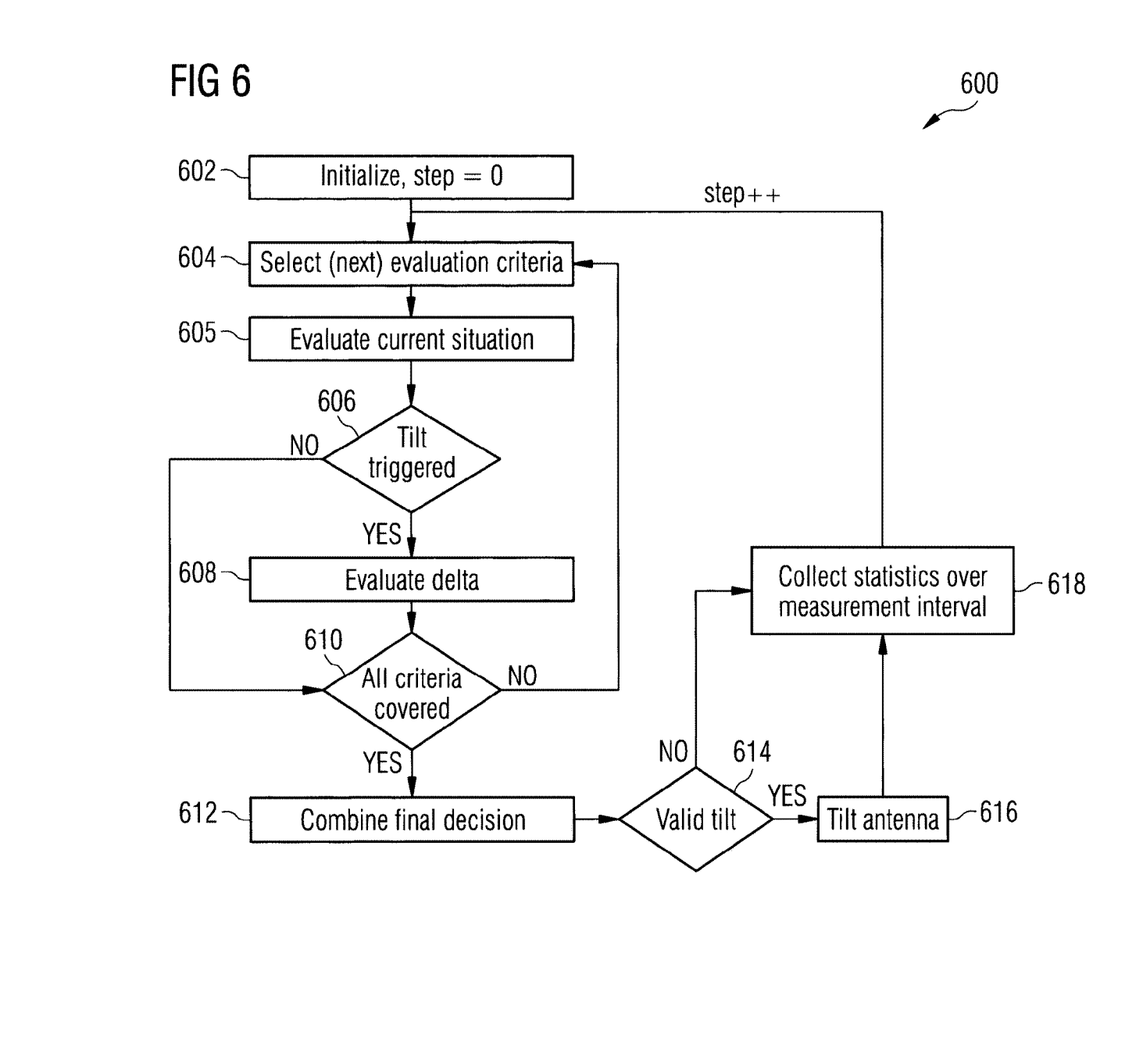

FIG. 6 illustrates a process 600 of separate validation of each optimization criterion according to an embodiment of the present invention. At block 602, the process is initialized and at block 604, the next evaluation criterion is selected. At block 605, the current conditions are evaluated according to the selected criterion and a tilt decision based on the criterion is recorded. At block 606, a determination is made as to whether a tilt change was triggered by the selected criterion in a previous iteration. If yes, the process proceeds to block 608 a delta evaluation is performed. That is, the previous tilt decision is validated with respect to the selected criterion by evaluating the performance change between the current and the previous iteration. The validation may be performed in terms of, for example, network counters and KPIs. At block 610, a determination is made as to whether all criteria have been evaluated. Returning now to block 606, if a tilt has not been triggered in the previous iteration, the process skips to block 610 because no change between the current and the previous step is presented for validation.

At block 610, if all criteria have not been evaluated, the process returns to block 604. If all criteria have been evaluated, the process proceeds to block 612 and the final decisions with respect to the different criteria are combined. At block 614, a determination is made as to whether the tilt decision is valid. If yes, the tilt is implemented at block 616. The process then proceeds to block 618 and statistics are collected over a measurement interval. If no, the process skips to block 618. After the collection of statistics at block 618, a counter is incremented and the process returns to block 604.

One primary task of the validation performed at block 608 is to check whether the performance improved or not. Another objective of validation is to make a correction if performance degraded or another problem occurred. Such an operation may be referred to as rollback. The rollback recognizes and reverses a (bad) tilt decision that, despite the optimization goals to increase performance, made it even worse than it was. This may be implemented using two flags: a fail flag and a rollback flag. The fail flag is set when the tilt change did to produce the expected outcome and validation of the impact fails. In one or more embodiments of the invention, setting the fail flag does not cause immediate action, because an additional attempt may be performed during a subsequent iteration. Such an approach tends to prevent a premature abandonment of an attempt at a local maximum and to provide for tolerance of short term variation of traffic demand. In addition, to allow small variations in results, a suitably configurable threshold, such as configurable 5% threshold, may be applied.

Figure 7:
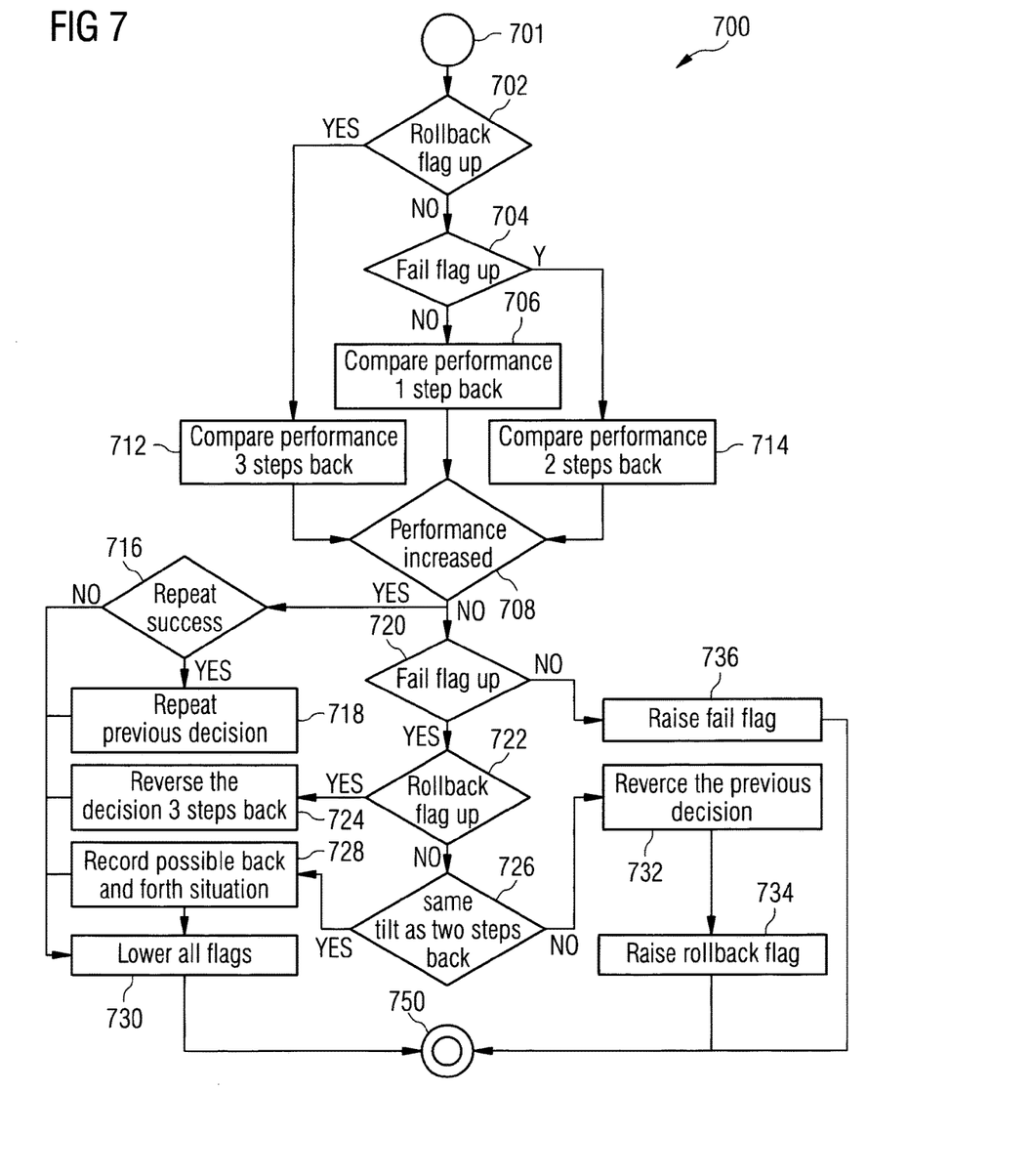

FIG. 7 illustrates a process of validation or rollback determination according to an embodiment of the present invention. The process 700 may be used, for example, to implement block 310 or block 608 discussed above. The process 700 begins at block 701, and at block 702, a determination is made as to whether a rollback flag is set. If no, the process proceeds to block 704 and a determination is made as to whether a fail flag is set. If no, the process proceeds to block 706, and a comparison is made with conditions at a previous iteration. The process then proceeds to block 708.

Returning now to block 702, if the rollback flag has been set, the process proceeds to block 712 and comparison is made against conditions three iterations previously. The process proceeds to block 708.

Returning now to block 704, if the fail flag has been set, the process proceeds to block 714 and a comparison is made against conditions two iterations previously. The process then proceeds to block 708.

At block 708, a determination is made as to whether performance has improved. If yes, the process proceeds to block 716. At block 716 a determination is made as to whether a successful tilt decision in a previous iteration should be repeated. If yes, the process proceeds to block 718 and the previous decision is repeated. In the case of separate validation, this is accomplished by overriding the tilt decision recorded at block 605. In case of a common validation, this is performed by setting "continue optimization" at block 312 as NO. All flags are then cleared.

Returning now to block 708, if performance has not improved, the process proceeds to block 720 and a determination is made as to whether the fail flag is set. If yes, the process proceeds to block 722 and determination is made as to whether the rollback flag is set. If yes, the process proceeds to block 724 and the decision of three iterations previously is reversed.

If the rollback flag is not set, the process proceeds to block 726 and a determination is made as to whether the tilt is the same as two iterations previously. If yes, the process proceeds to block 728 and a possible back and forth situation is noted. The process proceeds from block 728 to block 730 and all flags are cleared. If, at block 726, the tilt is not the same as two iterations previously, the process proceeds to block 732 and the previous decision is reversed. The process then proceeds to block 734 and the rollback flag is set. The process then terminates at block 750.

Returning now to block 720, if the fail flag is not set, the process proceeds to block 736 and the fail flag is set. The process then terminates at block 750.

As illustrated in FIG. 7 and discussed above, if validation recognizes a failed tilt decision occurring when the flag is already set, validation will execute a rollback which effectively takes back the previous tilt decisions that set the antenna tilt before setting the fail flag. However, an exception is made to this rule if the performance improves during the rollback increases (compared to conditions before failure), the rollback procedure is abandoned and all flags are cleared. During a rollback procedure, normal antenna tilt optimization is paused and "continue optimization" at block 312 returns "no". This procedure may be seen as reasonably slow when one optimization step can take several hours or even days and thus it may take days to rollback from the suboptimal setup. Another possible option for rollback would be to reverse the failed decision for the first notice, but this would not be able to adapt on the situation where at least two tilt steps are needed to change the load conditions between sectors.

An additional feature in the validation process is a repeat mechanism which is able to identify good decisions and repeat them. For example, if a decision is made to uptilt and the decision is seen to result in increased aggregated cell throughput in the area of inner and outer sector, the decision can be seen as successful. An assumption may be made that uptilt was the right direction for antenna tilt and uptilt may continue until aggregated cell throughput begins to decrease. This approach represents a departure from criteria based optimization because antenna tilt criteria is generally used as a trigger for series of tilt decisions which may exceed the criteria targets. In one or more embodiments of the invention, these two mechanisms—rollback and repeat—may bypass the main optimization loop. That is, "continue optimization" at block 312 may be set to NO option. In such embodiments, however, optimization need not stop; rather, optimization based on defined criteria may be suspended until the rollback or repeat process finishes.

Figure 8:
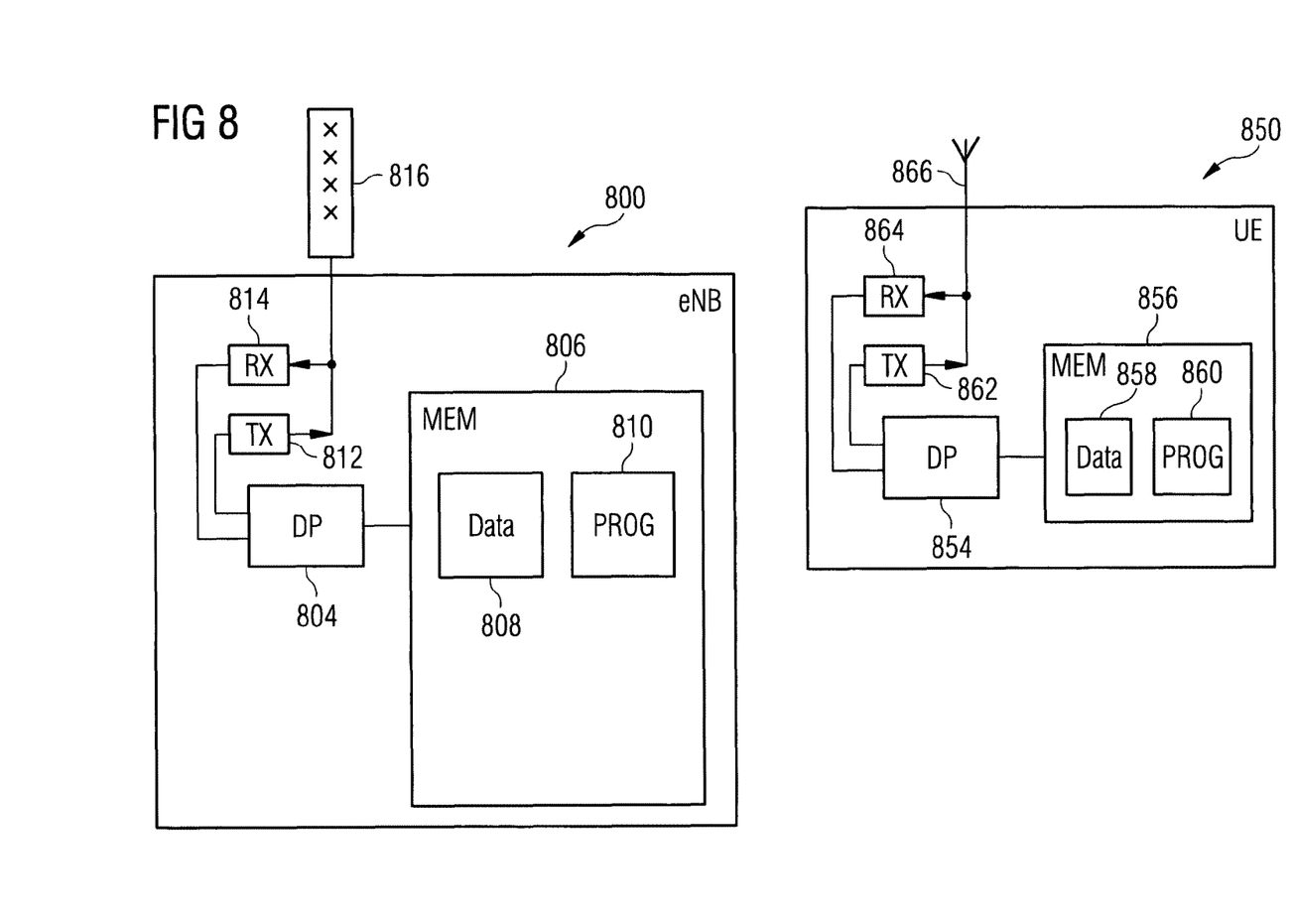
FIG. 8 illustrates elements according to an embodiment of the present invention.

Reference is now made to FIG. 8 for illustrating a simplified block diagram of a base station, such an eNB 800 and a user device, such as a UE 850, suitable for use in practicing the exemplary embodiments of this invention. In FIG. 8 an apparatus, such as the eNB 800, is adapted for communication with other apparatuses having wireless communication capability, such as the UE 850.

The eNB 800 includes processing means such as at least one data processor (DP) 804, storing means such as at least one computer-readable memory (MEM) 806 storing data 808 and at least one computer program (PROG) 810 or other set of executable instructions, communicating means such as a transmitter TX 812 and a receiver RX 814 for bidirectional wireless communications with the UE 850 via an antenna array 816.

The UE 850 includes processing means such as at least one data processor (DP) 854, storing means such as at least one computer-readable memory (MEM) 856 storing data 858 and at least one computer program (PROG) 860 or other set of executable instructions, communicating means such as a transmitter TX 862 and a receiver RX 864 for bidirectional wireless communications with the eNB 800 via one or more antennas 866.

At least one of the PROGs 810 in the eNB 800 is assumed to include a set of program instructions that, when executed by the associated DP 804, enable the device to operate in accordance with the exemplary embodiments of this invention, as detailed above. In these regards the exemplary embodiments of this invention may be implemented at least in part by computer software stored on the MEM 806, which is executable by the DP 804 of the eNB 800, or by hardware, or by a combination of tangibly stored software and hardware (and tangibly stored firmware). Similarly, at least one of the PROGs 860 in the UE 850 is assumed to include a set of program instructions that, when executed by the associated DP 854, enable the device to operate in accordance with the exemplary embodiments of this invention, as detailed above. In these regards the exemplary embodiments of this invention may be implemented at least in part by computer software stored on the MEM 856, which is executable by the DP 854 of the UE 850, or by hardware, or by a combination of tangibly stored software and hardware (and tangibly stored firmware). Electronic devices implementing these aspects of the invention need not be the entire devices as depicted at FIG. 1 or FIG. 12 or may be one or more components of same such as the above described tangibly stored software, hardware, firmware and DP, or a system on a chip SOC or an application specific integrated circuit ASIC.

In general, the various embodiments of the UE 850 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 806 and 856 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 804 and 856 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. An apparatus comprising:
at least one processor;
memory storing computer program code; wherein the memory storing the computer program code is configured to, with the at least one processor, cause the apparatus to at least:
after initializing antenna tilt, direct collection of information relating to conditions prevailing in an inner and outer sector of a wireless communication cell, wherein at least the inner sector is configurable based on the antenna tilt; and
determine adjustment of the antenna tilt corresponding to the inner sector based on analysis of the conditions, wherein analysis of the conditions is performed with respect to at least one criterion associated with characteristics of at least the inner sector of the wireless communication cell.

2. The apparatus of claim 1, wherein determination of the adjustment of the antenna tilt is performed iteratively by making automatic adjustments based on analysis of conditions with respect to the at least one criterion and performing repeated comparisons of conditions against the at least one criterion.

3. The apparatus of claim 1, wherein determination of adjustment of antenna tilt comprises making a tilt decision based on comparison of the conditions against the at least one criterion and validation of the tilt decision.

4. The apparatus of claim 3, wherein validation of the tilt decision comprises identification of a failure condition indicating a need to repeat the determination.

5. The apparatus of claim 1, wherein the at least one criterion comprises performance measured by at least one key performance indicator.

6. The apparatus of claim 1, wherein the at least one criterion is a desired load balance.

7. The apparatus of claim 1, wherein the load balance is based on a specified number of users and wherein analysis of the conditions comprises determining the number of users in each of the inner sector and the outer sector.

8. The apparatus of claim 1, wherein the load balance is based on throughput and wherein analysis of the conditions comprises determining throughput in each of the inner sector and the outer sector.

9. The apparatus of claim 1, wherein the at least one criterion is a specified capacity difference between the inner sector and the outer sector.

10. The apparatus of claim 9, wherein analysis of the conditions comprises determining capacity for each of the inner sector and the outer sector and wherein capacity is determined based at least in part on available time transmission intervals.

11. The apparatus of claim 9, wherein analysis of the conditions comprises determining capacity for each of the inner sector and the outer sector and wherein capacity is determined based at least in part on available physical resource blocks.

12. The apparatus of claim 1, wherein the at least one criterion is interference.

13. The apparatus of claim 12, wherein analysis of the conditions comprises determining interference and wherein determining interference is based at least in part on reference signal received power distribution.

14. The apparatus of claim 12, wherein analysis of the conditions comprises determining interference and wherein determining interference is based at least in part on reference signal code power distribution.

15. The apparatus of claim 12, wherein analysis of the conditions comprises determining interference and wherein determining interference is based at least in part on modulation coding scheme distribution.

16. The apparatus of claim 12, wherein analysis of the conditions comprises determining interference and wherein determining interference is based at least in part on channel quality information distribution.

17. The apparatus of claim 12, wherein analysis of the conditions comprises determining interference and wherein determining interference is based at least in part on reference signal strength indicator distribution.

18. The apparatus of claim 12, wherein analysis of the conditions comprises determining interference and wherein determining interference is based at least in part on reference signal received power information.

19. The apparatus of claim 12, wherein analysis of the conditions comprises determining interference and wherein determining interference is based at least in part on reference signal code power information.

20. The apparatus of claim 12, wherein analysis of the conditions comprises determining interference and wherein determining interference is based at least in part on modulation coding scheme distribution.

21. The apparatus of claim 1, wherein the at least one criterion is a desired throughput.

22. The apparatus of claim 1, wherein the at least one criterion is a maximum number of radio link failures.

23. The apparatus of claim 1, wherein the at least one criterion comprises a maximum number of inter-system handoffs.

24. The apparatus of claim 1, wherein the at least one criterion comprises a plurality of criteria, and wherein relative weightings are assigned to each of the criteria to determine their influence on the tilt decision.

25. A method comprising:
after initializing antenna tilt, directing collection of information relating to conditions prevailing in an inner and outer sector of a wireless communication cell, wherein at least the inner sector is configurable based on the antenna tilt; and
determining adjustment of the antenna tilt corresponding to the inner sector based on analysis of the conditions, wherein analysis of the conditions is performed with respect to at least one criterion associated with characteristics of at least the inner sector of the wireless communication cell.

26. The apparatus of claim 1, wherein the memory storing the computer program code is further configured to, with the at least one processor, cause the apparatus to at least:
perform adjustment of the antenna tilt based on the determined adjustment and at least one flag, wherein the at least one flag includes at least one of a rollback flag, and a fail flag.

* * * * *